(12) United States Patent
Klenk et al.

(10) Patent No.: US 11,135,837 B2
(45) Date of Patent: Oct. 5, 2021

(54) DIGITAL PRINTING ON PAPER BAGS FOR LOW VOLUME APPLICATIONS

(71) Applicants: Karl-Michael Klenk, Mesa, AZ (US); David Lawrence Castaneda, Phoenix, AZ (US)

(72) Inventors: Karl-Michael Klenk, Mesa, AZ (US); David Lawrence Castaneda, Phoenix, AZ (US)

(73) Assignee: SmartHealth, Inc., Phoenix, AZ (US)

( * ) Notice: Subject to any disclaimer, the term of this patent is extended or adjusted under 35 U.S.C. 154(b) by 93 days.

(21) Appl. No.: 16/729,843

(22) Filed: Dec. 30, 2019

(65) Prior Publication Data

US 2021/0197556 A1 Jul. 1, 2021

(51) Int. Cl.
*B41J 2/045* (2006.01)

(52) U.S. Cl.
CPC ....... *B41J 2/04556* (2013.01); *B41J 2/04586* (2013.01)

(58) Field of Classification Search
CPC .................. B41J 2/04556; B41J 2/04586
See application file for complete search history.

(56) References Cited

U.S. PATENT DOCUMENTS

| | | | |
|---|---|---|---|
| 2007/0212502 A1* | 9/2007 | Hansborough | B65D 33/004 428/35.2 |
| 2008/0227611 A1 | 9/2008 | Aspenns et al. | |
| 2014/0121088 A1 | 5/2014 | Schindler, II et al. | |
| 2018/0297356 A1 | 10/2018 | Capoia | |
| 2019/0018629 A1 | 1/2019 | Seay | |
| 2019/0070822 A1 | 3/2019 | Kohn et al. | |
| 2019/0084264 A1 | 3/2019 | Sallot et al. | |
| 2019/0184715 A1* | 6/2019 | Kohn | B41J 2/21 |
| 2019/0263081 A1 | 8/2019 | Wehrmann | |

FOREIGN PATENT DOCUMENTS

| | | |
|---|---|---|
| JP | 3120545 U | 4/2006 |
| JP | 6592650 B2 | 10/2019 |
| TW | M391476 U | 11/2010 |
| WO | WO 2009/153389 A1 | 12/2009 |
| WO | WO 2016/072098 A1 | 5/2016 |

* cited by examiner

*Primary Examiner* — Lamson D Nguyen
(74) *Attorney, Agent, or Firm* — Reinhart Boerner Van Deuren P.C.

(57) ABSTRACT

Embodiments of a method of printing low volumes of paper bags on a digital printing press are provided. In the method, a plurality of orders are received. Each order includes a particular format relating to a bag size selected from a predetermined number of bag sizes and a graphic to be printed. In the method, the plurality of orders are organized into a plurality of batches. Each batch includes orders of the plurality of orders having a same bag size. A first batch is selected, and the graphic of the orders contained in the first batch is digitally printed on a first roll of paper having dimensions associated with the bag size of the first batch. The first roll of paper is fed through the digital printing press, and the digital printing press prints the graphic of each order contained in the first batch without stopping when transitioning between orders.

20 Claims, 4 Drawing Sheets

DIGITAL PRINTING ON PAPER BAGS FOR LOW VOLUME APPLICATIONS

FIELD OF THE INVENTION

This invention generally relates to a method of printing on paper bags and, in particular, to a method of digitally printing on paper bags for low volume applications.

BACKGROUND OF THE INVENTION

Many service providers supply their customers with items to take home after performing a service. For example, a dentist may provide a patient with a toothbrush, floss, tooth paste, appointment card, etc. to take home after an appointment. Such items are typically provided in a bag that is handed to the customer as the customer leaves the provider's premises. Such bags generally include printed graphics (e.g., words, logos, pictures, etc.) that relate to the service provider. Typically, the bag is a plastic bag because of the low cost of plastic and bag production as compared to bags made of other materials. However, plastic waste, and in particular plastic bag waste, has had a significant negative environmental impact. In view thereof, Applicant has identified a need in the art for an alternative to plastic bags that does not have the same significant negative environmental impact as plastic bags.

One possible alternative identified by Applicant is paper bags. However, bags made of paper present several challenges that are not encountered in plastic bag printing. In order to better understand the challenges of printing on paper, additional background information is provided regarding conventional methods of printing and converting paper bags.

In general, paper bags are either printed on a roll and then converted ("print-then-convert"), or the paper bags are assembled and then imprinted ("print-after-convert"). Print-then-convert is the more popular of the two methods. As a result of the physical structure requirements of paper bag converting, the decorating process must support wide paper widths of typically 15 inches (15") or greater. Conventionally, decorating is almost exclusively accomplished in-line with the converting equipment to minimize handling and to lower cost. Generally, such printing and converting lines are designed for large order quantities to minimize the cost per unit.

For the print-then convert process, flexographic printing technology is the most common decorating method and requires the use of physical plates that are premade and prepared for each image color channel. Image quality typically is at a minimally commercially acceptable standard and is expensive for initial preparation. The image quality can be increased, but such increases in image quality come with higher related costs. Because of the expense and preparation time for each color channel, typical applications for low volume requests are limited to one or two colors. High-quality, full-color decorations are restricted to higher volume requests in order to offset the high initial expense and preparation times. Thus, flexographic printing of paper bags in a print-then-convert process is associated with high initial costs, which necessitates high volumes to achieve economical unit rates, and with longer production delivery times and comparably lower quality decorating reproduction techniques. Further, in-line processes require the entire production line to be idle during image changeovers, which is costly and which is again another reason why high volume jobs are performed using flexographic printing.

The other, less popular method of providing printed paper bags involves imprinting on pre-converted paper bags (i.e., print-after-convert technique), which can be accomplished in a few ways. However, each way requires a process that can accommodate the multi-dimensional thickness of a ready-to-use paper bag. A variety of known printing techniques can be used to decorate the paper bags, but each technique has distinct disadvantages that limit their usefulness for full color decorating of low volume merchant-style paper bags. When printing on a pre-converted paper bag, all of the conventional techniques are typically only able to decorate a single side at a time and would require multiple production passes to decorate multiple sides. Using multiple printing runs to print each bag incurs much more expense in the production of the paper bags.

Flexographic printing can also be used on pre-converted paper bags. Typically, when printing on pre-converted bags, only a single color is used. The use of a physical plate for each color channel is not suitable for full color decorated paper bags due to quality issues with color-to-color registration. Further, as with the print-then-convert process, the use of a physical plate for each color channel requires expensive preparation cost and time.

Pre-converted paper bags can also be decorated using lithographic printing techniques. Such lithographic printing setups also typically use only a single color or perhaps two colors. The lithographic process requires high pressures be applied to the entire printed surface. This pressure is difficult to apply to a pre-converted paper bag because of the multi-dimensional thickness, resulting in wrinkles and an inferior product quality. Productivity limiting attributes make use for full color decoration uneconomical, and the physical plates require preparation time and expense.

Still further, pre-converted paper bags can be decorated using inkjet printing techniques. As compared to flexographic and lithographic techniques, inkjet printing offers the best option for full color decoration of pre-converted bags. However, the multi-dimensional thickness of the bags may cause quality issues as a result of jetting spread distance variations. Further, current inkjet inks are expensive compared to flexographic or lithographic inks, and per unit cost increases rapidly when increasing image coverage. Further, per unit cost does not decrease appreciably with an increased number of units (unlike the flexographic and lithographic techniques were large volumes are needed to offset the initial setup cost). Notwithstanding, quality is generally considered commercially acceptable, but inkjet printers are subject to streaking as a result of clogged ink application nozzles, resulting in process waste.

As can be seen from the foregoing discussion, there are several technical and economic challenges to printing on paper bags where only small volumes are needed. As discussed above, the flexographic and lithographic techniques require substantial investment in setup, and the cost can only be offset by high volume printing jobs. Further, when printing on paper bags or rolls that are converted to paper bags, these techniques require considerable preparation efforts that can lead to extended delivery times.

BRIEF SUMMARY OF THE INVENTION

The present disclosure addresses the foregoing problems and limitations associated with plastic bags and with the methods of producing decorated paper bags. These and other advantages of the invention, as well as additional inventive features, will be apparent from the description provided herein.

As will be discussed in greater detail, the proposed method provides economical production of low quantity print jobs (e.g., less than 2000 units) for paper bags having widths between 4 inches and 14 inches. The method provides rapid production times compared to current flexographic reproduction methods. Additionally, the method produces very high quality reproduction of color graphics and photographs compared to flexographic processes. Still further, the process has the ability to decorate paper bags on a single or multiple sides, including on optional gusset areas.

In one aspect, the present disclosure provides a method of printing low volumes of paper bags on a digital printing press. In the method, a plurality of orders are received. Each order of the plurality of orders includes a graphic to be printed and a particular format. The particular format relates to a bag size selected from a predetermined number of bag sizes. In the method, the plurality of orders are organized into a plurality of batches. Each batch of the plurality of batches includes orders of the plurality of orders having a same bag size. A first batch of the plurality of batches is selected, and the graphic of the orders contained in the first batch of the plurality of batches is digitally printed on a first roll of paper having dimensions associated with the bag size of the first batch. The first roll of paper moves continuously through the digital printing press, and the digital printing press continuously prints the graphic of each order contained in the first batch without stopping when transitioning between orders.

In another aspect, the present disclosure provides a method of converting low volumes of paper bags on a bag converting machine. In the method, a printed paper roll including a plurality of digitally printed orders is provided. All orders of the plurality of digitally printed orders are configured for converting into paper bags having identical dimensions. Each order of the plurality includes a unique printed graphic. Further, each order includes a format template configured to align the bag converting machine to convert the printed paper roll into paper bags having the dimensions associated with the plurality of digitally printed orders. In the method, the bag converting machine is configured using the format template on the printed paper roll, and the printed paper roll is converted into a plurality of paper bags.

In still another aspect, the present disclosure provides a method of printing and converting paper bags. In the method, a plurality of orders is received. Each order of the plurality of orders has a graphic to be printed and a particular format. The particular format includes a bag size selected from a predetermined number of bag sizes. The plurality of orders is organized into a plurality of batches. Each batch of the plurality of batches includes orders of the plurality of orders having a same bag size. The particular format and the graphic to be printed of each order is fitted to a format template. The format template includes markings for positioning the graphic on the paper bag and for aligning a roll of paper in a digital printing press and in a bag converting machine. A first batch of the plurality of batches is selected. The graphic of the orders contained in the first batch of the plurality of batches is digitally printed on the first roll of paper having dimensions associated with the bag size of the first batch. The first roll of paper moves continuously through the digital printing press, and the digital printing press continuously prints the graphic of each order contained in the first batch without stopping when transitioning between orders. The bag converting machine is configured using the format template on the printed paper roll, and the printed paper roll is converted into a plurality of paper bags.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As will be described below and in conjunction with the figures, various embodiments of a method for digitally printing low volumes of merchant-style, paper bags as well as paper bags produced according to the method are provided herein. Advantageously, the method allows for digitally printing multiple customer jobs within a single printing run by aggregating jobs according to format sizes, which are offered to customers in a predetermined number of format sizes. In this way, the printing run is able to transition between the jobs of different customers without having to stop the line to change imprints, inks, paper sizes, etc. as is required in other printing techniques. Printing digitally in this manner allows for economical printing of low volume print jobs, which is not possible using other printing techniques. These and other advantages will be discussed more fully below, including in relation to the embodiments described herein and depicted in the figures. The embodiments presented are for the purposes of illustration, not limitation.

Figure 1A:
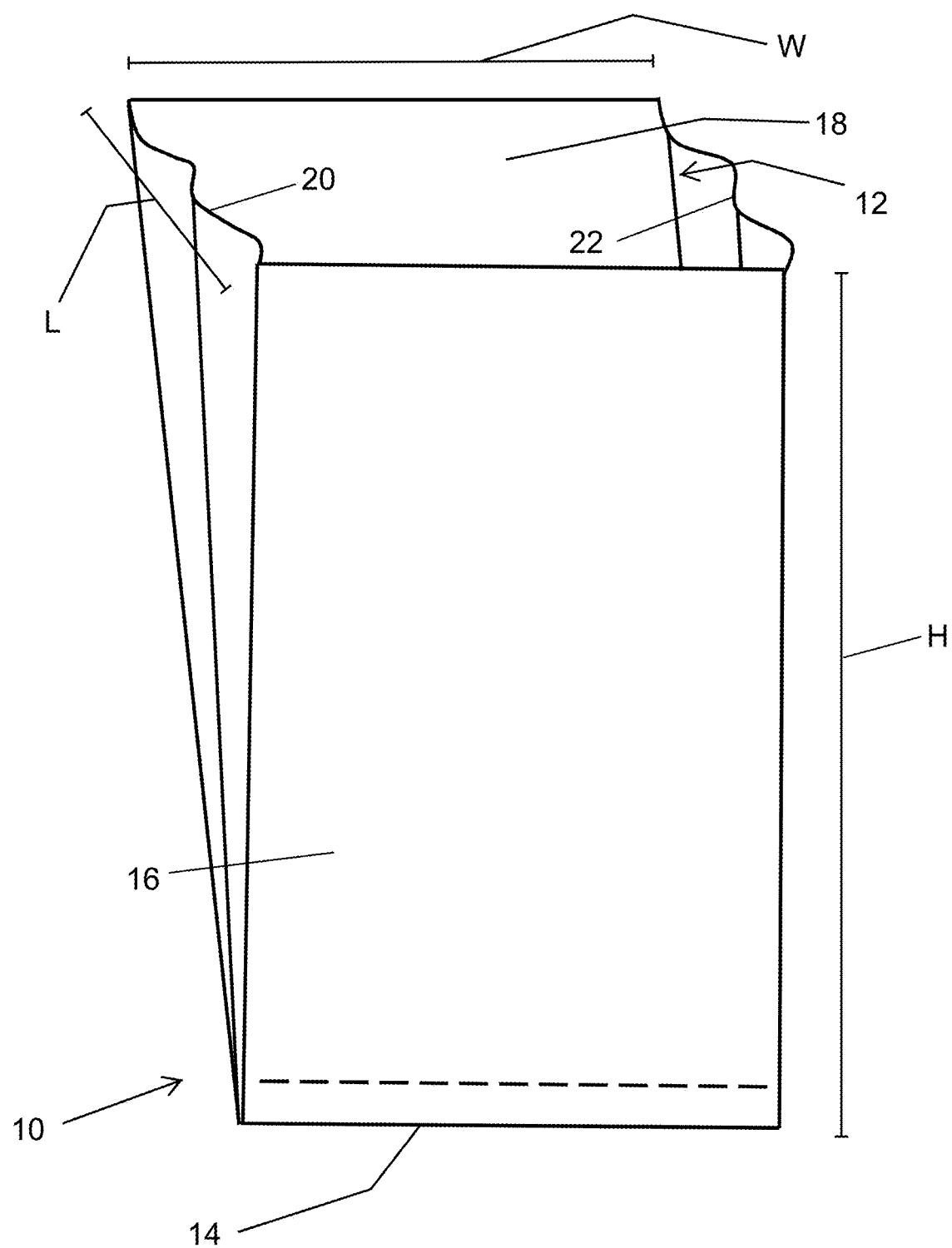
FIGS. 1A-1C depict example paper bags of the type that can be produced according to the digital printing and converting process, according to an exemplary embodiment.
Figures 1B, 1C:
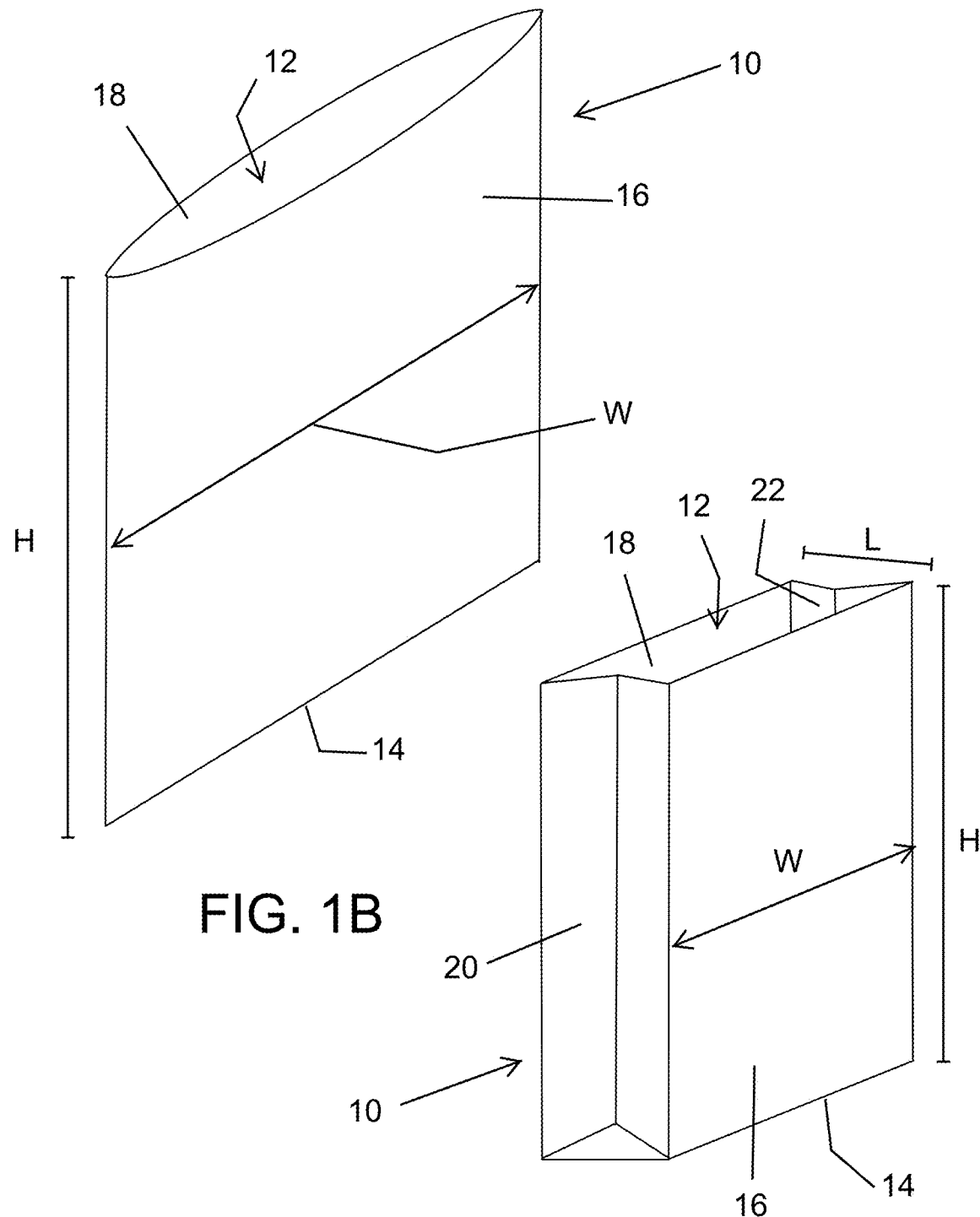

FIGS. 1A and 1B depict embodiments of a pinch-bottom, merchant-style bag 10. FIG. 1C depicts an embodiment of a flat bottom bag 10. The teachings of the present disclosure apply to these paper bag types, among others, and these paper bag types are presented by way of illustration, not limitation. When referring to a "bag" generally, reference is made to any of these bag types or other similar bag types not shown. In embodiments, the bag 10 is made from paper. A variety of types of paper (e.g., materials, weights, colors, etc.) can be used to make the bag 10. As can be seen in FIGS. 1A-1C, each type of bag 10 has an open top 12 and a closed bottom 14. In FIGS. 1A and 1B, the closed bottom 14 is referred to as a "pinch-bottom" because the paper is folded over, or pinched, to close the bottom of the bag 10. The particular pinch-bottom style of bags 10 shown in FIGS. 1A and 1B has a creased bottom in which the bottoms of the bags 10 are each a crease line. The bag 10 shown in FIG. 1C is a flat bottom bag, such that the bag can stand on its closed bottom 14 panel. Still other types of paper bags known in the art can be printed according the presently disclosed method.

As shown in FIGS. 1A-1C, the bag 10 has a first face panel 16 and a second face panel 18. In embodiments, at least one of the first face panel 16 or the second face panel 18 includes a printed graphic (e.g., printed letters or pictures). In the embodiment of FIGS. 1A and 1C, the first face panel 16 and the second face panel 18 are separated by first gusset 20 and second gusset 22. In embodiments, at least one of the first gusset 20 or the second gusset 22 includes a printed graphic (e.g., printed letters or pictures). In this way, the presently disclosed method allows for printing on the gussets 20, 22, which is not possible or economically feasible in other methods of printing, especially methods of printing print-after-converting style bags. However, in another embodiment shown in FIG. 1B, the first face panel 16 is joined directly to the second face panel 18 of the bag 10 (i.e., such that there is no gusset area between the face panels 16, 18). The bag 10 has a height H along the vertical edges of the face panels 16, 18 and an opening width W across the face panels 16, 18. The embodiments of the bags 10 in FIGS. 1A and 1C also have an opening length L along the gussets 20, 22.

The graphics on the bag 10 are printed on the paper before folding the bag 10. In this way, the bag 10 is formed in a "print-then-convert" process. According to the present disclosure, the bag 10 is formed from a print roll that, after printing, is folded, glued, and/or cut (hereinafter, "converted") to achieved the desired dimensions (i.e., to achieve the desired height H, width W, and length L).

As discussed above, printing on the paper for converting of a roll of bags 10 can be expensive for small batches because of the printing set up. That is, generally the cost associated with a printing run for paper bags is so high that, economically, only large runs (i.e., multiple thousands) of bags are printed. Further, imprints only allow for the use of, e.g., two or three colors. In the method described herein, small runs, such as 2000 bags or less, 1800 bags or less, or 1600 bags or less, can be printed using a full range of colors and with digital quality.

Figure 2:
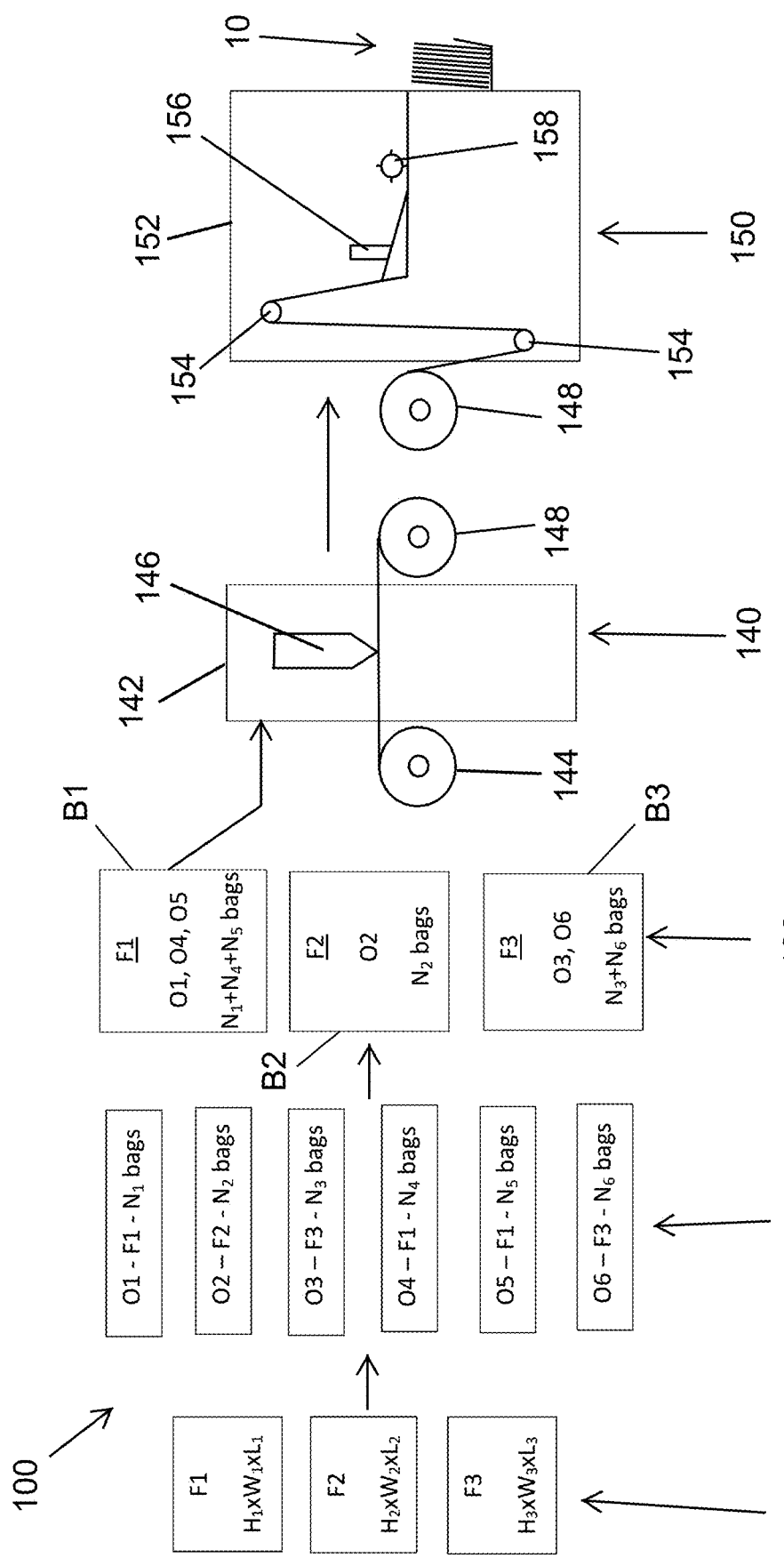
FIG. 2 is a flow diagram of a process for digitally printing paper bags, according to an exemplary embodiment.

FIG. 2 depicts a schematic flow diagram of a method 100 of printing a run of paper bags 10 that includes multiple customer orders. In particular, each run may include orders from multiple customers and/or may include multiple orders for a single customer. As will be discussed more fully below, each order of the printing run has a unique printed graphic, but each order of the printing run has the same format (e.g., same bag type, same paper type, and same dimensions). In embodiments, the format of a paper bag order generally corresponds to the height H, width W, and length L of the finished bags such that each order of the run has the same finished bag dimensions. According to the method 100 of FIG. 2, a first step 110 is providing to customers a predetermined number of formats corresponding to dimensions of the final bag. In embodiments, the predetermined number of formats is ten or less formats. In particular embodiments, the predetermined number of formats is seven or less formats, and in still other embodiments, the predetermined number of formats is five or less formats. In embodiments, the predetermined number of formats is at least three formats. In particular embodiments, each of the formats of the predetermined number of formats corresponds to a finished bag width W of from 4" to 14".

FIG. 2 schematically depicts three different formats, which are designated as F1, F2, and F3. As can be seen in FIG. 2, each format F1, F2, F3 has at least a height ($H_1$, $H_2$, $H_3$) and width ($W_1$, $W_2$, $W_3$) associated therewith, and depending on the type of paper bag, the formats F1, F2, F3 may also have a length ($L_1$, $L_2$, $L_3$) associated therewith defining a gusset area. For simplicity of illustration, each format F1, F2, F3 is referred to by a height, width, and length, but for certain paper bag styles (e.g., the bag 10 of FIG. 1B without gussets), the length dimension may be zero. Individual dimensions of the formats F1, F2, F3 may be the same as another format F1, F2, F3, but at least one dimension of each format F1, F2, F3 is different from the corresponding dimension of the other formats F1, F2, F3. Further, in embodiments the formats F1, F2, F3 may be associated with different paper bag styles, may necessitate different size paper feed rolls, or may necessitate different types (e.g., paper weight, material, coating, finish, etc.) of paper feed rolls.

Figure 3:
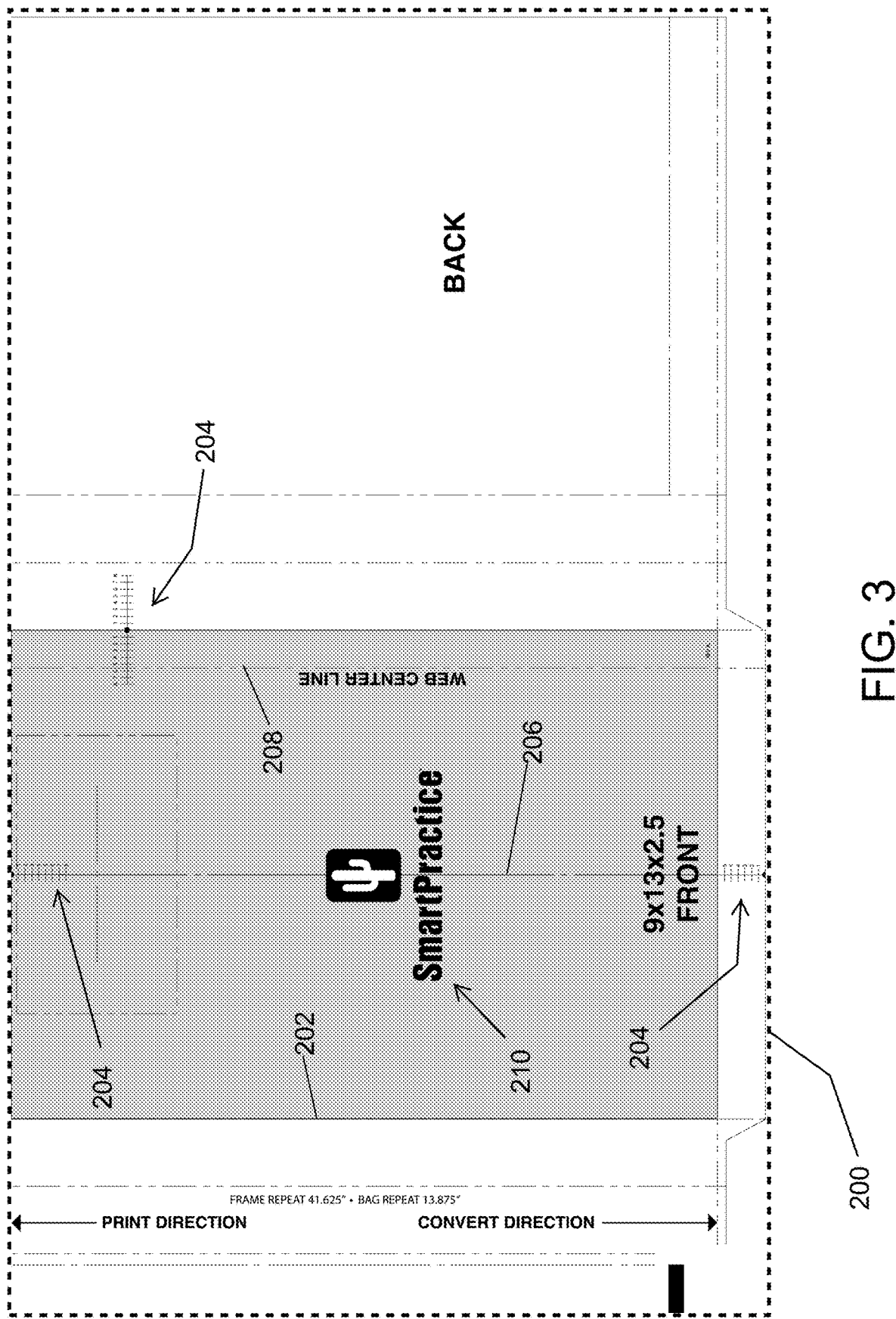
FIG. 3 depicts a format template for aligning a custom decoration on a paper roll for digital printing and for ensuring proper placement of the printed template during bag converting, according to an exemplary embodiment.

For each of the predetermined formats, a preconfigured format template is created along with preconfigured format template master digital file for each format of the predetermined number of formats to be offered. The preconfigured format template described herein is designed specifically for roll printing and bag converting processing and will include at least one process control marking. As will be discussed below, the preconfigured format template master image is designed to aid in setting up the bag conversion equipment for converting the printed roll into bags. An example of a preconfigured format template 200 is shown in FIG. 3. In various embodiments, the preconfigured format template may include fold lines 202, alignment measurement markers 204, a center line 206 for one or both of the face panels, and a center line 208 for the template 200, among other process control markings.

According to a second step 120 of the method 100, a plurality of orders (designated as O1-O6) are received from one or more customers. Each order O1-O6 includes one of the predetermined formats F1, F2, F3 along with each customer's digital graphics file for decoration of the paper bag. Additionally, each order O1-O6 will have a number of units associated therewith. For example, order O1 is in the format F1 and is for $N_1$ number of bags. Referring again to FIG. 3, the customer's digital graphics 210 are electronically manipulated into the preconfigured format template 200 for the particular predetermined format selected in the order. In this way, the preconfigured format template 200 ensures that the customer's digital graphics 210 for decorating is in the correct file format and position for optimal processing during printing and converting.

Upon receiving a plurality of orders, the orders O1-O6 are aggregated into batches based on format in a third step 130. That is, a customer may provide multiple orders for the same format with each order containing a different graphic component, or multiple customers may each submit an order requesting the same format (and likely different graphic components). All orders having the same format are aggregated into a single batch. As shown in FIG. 2, there are three batches B1, B2, B3 corresponding to each format F1, F2, F3. However, depending on the orders received, the number of batches may be less than the number of formats offered. For example, orders O1, O4, and O5 are all in format F1 and, thus, are aggregated into batch B1. Order O1 has $N_1$ number of bags, order O4 has $N_4$ number of bags, and order O5 has $N_5$ number of bags. Therefore, batch B1 will include $N_1+N_4+N_5$ number of bags. Each order within a particular batch is electronically fitted to the format template 200 for that format size to ensure proper alignment of the customer's graphic on the bag and proper positioning during converting.

In a fourth step 140, one batch B1 of the plurality of batches B1, B2, B3 is selected for digital printing on a digital printing press 142. In an embodiment, the digital printing press 142 is a roll-fed digital printing press, schematically depicted with paper roll 144 being fed into the digital printing press 142. In an embodiment, the digital printing press has a width of greater than 15", e.g., to accommodate wide paper rolls necessary for printing pre-converted bags. In embodiments, the digital printing press 142 utilizes liquid toner 146 to deposit the image during printing. As depicted in FIG. 2, the digital printing press 142 takes up the paper as a printed paper roll 148

An example of a commercially available digital printing press suitable for use in the presently disclosed method is the HP Indigo series of digital presses. In another embodiment, the digital printing press 142 may be an inkjet printing press that uses inkjet printing inks instead of liquid toner. Examples of such inkjet printing presses include the HP PageWide inkjet press or the Canon Océ JetStream inkjet press.

The digital printing press 142 is prepared for printing of the batch of orders by configuring the press operation settings for the proper physical specifications of the paper, including thickness, width, and tension. Further, the color requirements for the orders in the batch are set. Advantageously, all of the orders of each batch (e.g., O1, O4, O5 of the batch B1) can be printed continuously in succession without having to stop the digital printing press 142 to reconfigure the image settings when transitioning, e.g., from order O1 to order O4 and from order O4 to order O5.

Notwithstanding the continuous transition between orders, the use of the preconfigured format template 200 as shown in FIG. 3 ensures consistent image position placement, image orientation, and image placement repeat. In particular, once the digital printing press 142 is prepared for a specific format and the preconfigured format template master digital file is printed and verified to be properly reproduced, the customer's digital graphics files for decorating inside the preconfigured format template are processed in their ordered sequence. Further, the process markings of the preconfigured format template 200 also ensure proper initial alignment and positioning during printing and subsequent converting, which substantially reduces or eliminates loss of product resulting from processing errors of position. In this regard, the preconfigured format template 200 is designed to maintain the proper running repeat required for downstream processing without stopping between orders. Each following order is printed with the proper physical spacing required by the specific format to allow uninterrupted processing of the printed paper roll and the process will repeat until all submitted order requirements are met for the specific batch.

As shown schematically in step 150 of the method of FIG. 2, the digitally printed roll of paper 148 is converted to bags 10 in a bag converting machine 152. The particular bag converting machine 152 employed may depend at least in part on the particular type of paper bag made (e.g., creased bottom or flat bottom). However, certain machines may be configurable to produce multiple types of paper bags. In an exemplary embodiment, the bag converting machine 152 is WFD-400 available from Shanghai ProMega Trading Co., Ltd.

For context, FIG. 2 provides a schematic depiction of an example bag converting machine 152. It should be recognized that the schematic depiction is a simplistic depiction of a machine that may vary significantly based on the particular manufacturer and type of bag being produced. However, such bag converting machines 152 are known in the art and are commercially available from a variety of sources. In the embodiment of FIG. 2, the bag converting machine 152 contains tension rollers 154, a folding tool 156, and a cutting roller 158. The tension rollers 154 provide the requisite tension for positioning and folding the printed paper roll 148. The folding tool 156 presses into the middle of the printed paper roll 148 to cause the edges of the printed paper roll 148 to flare up, and downstream rollers or guide rails fold the flared edges over. At the same time, an adhesive may be applied (or the paper roll may contain a strips of adhesive) to one or both edges to create a loop of paper. The cutting roller 158 cuts the loop into the proper size so that, after pinching/creasing the bottom closed, the bag 10 has the proper dimensions. Another folding tool (not shown) may be used to close the bottom of the bag 10.

As shown in the embodiment of depicted in FIG. 2, the roll of printed paper 148 is taken from the digital printing press 142 and becomes the input roll for the bag converting machine 152 on a separate processing line, where the paper is converted to bags 10. However, in other embodiments, the printed paper roll 148 may be fed directly into the bag converting machine 152 so that the printed paper roll 148 is continuously printed and converted into paper bags 10 on the same processing line.

The preconfigured format template 200 printed on the printed paper roll 148 is used to configure the bag converting machine 152. In particular, the preconfigured format template 200 is fed into the bag converting machine 152 and used to configure the machine components, such as, e.g., the tension rollers 154, the folding tool 156, and the cutting roller 158, among others. Once the bag converting machine 152 is properly configured using the preconfigured format template, the printed roll of orders is properly loaded into the machine and processed in sequence. In embodiments, digital registration controls incorporated in the machine 152 will automatically align the printing to the proper format spacing by following the control markings incorporated into the preconfigured format template 200.

Advantageously, the method disclosed herein allows for continuous production such that there is no need to stop production when transitioning between orders. In embodiments, order separation may be handled at the end of the paper bag converting operations, and then the orders are processed for delivery. Submitted orders for the current format of the digital printing press 142 and the bag converting machine 152 are completed and then the entire process is configured for the next required physical format (e.g., batch B2 or batch B3). In this way, continuous operations are possible with comparably rapid fulfillment times for economically priced, high quality merchant style paper bag products. Indeed, as compared to prior printing techniques (such as flexographic and lithographic printing), the disclosed method does not require expensive physical printing plates, necessitating larger-volume orders to recoup the investment into the plates. Further, the digital printing technique allows for a full range of colors to be used and for high quality digital images to be repeatably reproduced. Additionally, using the print-then-convert technique allows for printing in gusset areas. Still further, if the printing and converting are conducted on separate processing lines, downtime is substantially reduced because the bag converting machine can be configured for a particular format during printing, and then during bag converting, the digital printing press can be configured for a next run. Thus, by offering a particular number of formats (based on preconfigured format templates) to customers and aggregating those orders into batches having the same format for digital printing and converting, low volume orders (e.g., 2000 bags or less) can be prepared in an economical way.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of printing low volumes of paper bags on a digital printing press, comprising the steps of:
    receiving a plurality of orders, each order of the plurality of orders comprising a graphic to be printed and a particular format, wherein the particular format comprises a bag size selected from a predetermined number of bag sizes;
    organizing the plurality of orders into a plurality of batches, wherein each batch of the plurality of batches comprises orders of the plurality of orders having a same bag size;
    selecting a first batch of the plurality of batches; and
    digitally printing the graphic of the orders contained in the first batch of the plurality of batches on a first roll of paper having dimensions associated with the bag size of the first batch, wherein the first roll of paper moves continuously through the digital printing press and wherein the digital printing press continuously prints the graphic of each order contained in the first batch without stopping when transitioning between orders.

2. The method of claim 1, wherein the predetermined number of bag sizes is at least three.

3. The method of claim 2, wherein the predetermined number of bag sizes is at most ten.

4. The method of claim 3, wherein each of the bag sizes has a height dimension, a length dimension, and a width dimension, and wherein each bag size differs from the other bag sizes in at least one of the height dimension, the length dimension, or the width dimension.

5. The method of claim 1, further comprising the step of fitting the particular format and graphic to be printed of each order to a digital format template, the digital format template comprising markings for positioning the graphic on the paper bag and for aligning the first roll of paper in the digital printing press.

6. The method of claim 5, wherein for each order of the first batch, the method further comprises printing each digital format template on the first roll of paper to produce a physical format template.

7. The method of claim 6, wherein after the step of digital printing, the method further comprises converting the first roll of paper into individual paper bags on a bag converting machine, wherein the physical format template configures the bag converting machine for converting each order of the first batch.

8. The method of claim 7, wherein the bag converting machine is in line with the digital printing press such that the first roll of paper is fed from the digital printing press into the bag converting machine.

9. The method of claim 1, wherein the paper bag comprises a first face panel and a second face panel and wherein the first face panel is joined along lateral edges to the second face panel.

10. The method of claim 1, wherein the paper bag comprises a first face panel and a second face panel, wherein the first face panel and the second face panel are separated by a first gusset and a second gusset, and wherein the method further comprises digitally printing on at least one of the first face panel or the second face panel and on at least one of the first gusset or the second gusset.

11. The method of claim 1, wherein the paper bag comprises a creased bottom.

12. The method of claim 1, wherein the paper bag comprises a flat bottom.

13. The method of claim 1, wherein each order comprises 2000 paper bags or less.

14. The method of claim 1, wherein the plurality of orders comprises up to 150 orders.

15. The method of claim 1, wherein the step of digitally printing further comprises applying a liquid toner to the first roll of paper as the first roll of paper moves continuously through the digital printing press.

16. The method of claim 1, wherein the digital printing press is an inkjet printing press.

17. The method of claim 1, wherein after the step of digitally printing, the method further comprises:
    selecting a second batch of the plurality of batches;
    digitally printing the graphic of the orders contained in the second batch of the plurality of batches on a second roll of paper having dimensions associated with the bag size of the second batch, wherein the second roll of paper moves continuously through the digital printing press and wherein the digital printing press continuously prints the graphic of each order contained in the second batch without stopping when transitioning between orders.

18. A method of converting low volumes of paper bags on a bag converting machine, the method comprising the steps of:

providing a printed paper roll comprising a plurality of digitally printed orders, wherein all orders of the plurality of digitally printed orders are configured for converting into paper bags having identical dimensions, wherein each order of the plurality comprises a unique printed graphic, and wherein each order includes a format template configured to align the bag converting machine to convert the printed paper roll into paper bags having the dimensions associated with the plurality of digitally printed orders;

configuring the bag converting machine using the format template on the printed paper roll; and converting the printed paper roll into a plurality of paper bags.

19. The method of claim 18, wherein the step of converting comprises continuously converting the printed paper roll into the plurality of paper bags without stopping during transitions between each order of the plurality of digitally printed orders.

20. A method of printing and converting paper bags, comprising the steps of:

receiving a plurality of orders, each order of the plurality of orders comprising a graphic to be printed and a particular format, wherein the particular format comprises a bag size selected from a predetermined number of bag sizes;

organizing the plurality of orders into a plurality of batches, wherein each batch of the plurality of batches comprises orders of the plurality of orders having a same bag size;

fitting the particular format and graphic to be printed of each order to a format template, the format template comprising markings for positioning the graphic on the paper bag and for aligning the first roll of paper in a digital printing press and in a bag converting machine;

selecting a first batch of the plurality of batches;

digitally printing the format template and the graphic of the orders contained in the first batch of the plurality of batches on a first roll of paper having dimensions associated with the bag size of the first batch, wherein the first roll of paper moves continuously through the digital printing press and wherein the digital printing press continuously prints the graphic of each order contained in the first batch without stopping when transitioning between orders;

configuring the bag converting machine using the format template on the printed paper roll; and converting the printed paper roll into a plurality of paper bags.

* * * * *